(12) United States Patent
Na et al.

(10) Patent No.: US 11,743,756 B2
(45) Date of Patent: *Aug. 29, 2023

(54) BASE STATION, AND QOS CONTROL METHOD OF WIRELESS SECTION

(71) Applicant: SK TELECOM CO., LTD., Seoul (KR)

(72) Inventors: Min Soo Na, Seoul (KR); Chang Soon Choi, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,291

(22) Filed: Feb. 28, 2022

(65) Prior Publication Data

US 2022/0182871 A1   Jun. 9, 2022

Related U.S. Application Data

(63) Continuation of application No. 16/348,938, filed as application No. PCT/KR2018/003971 on Apr. 4, 2018, now Pat. No. 11,297,524.

(30) Foreign Application Priority Data

Jul. 26, 2017   (KR) .................. 10-2017-0094896

(51) Int. Cl.
*H04W 28/10*   (2009.01)
*H04W 36/00*   (2009.01)
(Continued)

(52) U.S. Cl.
CPC ....... *H04W 28/0236* (2013.01); *H04W 28/02* (2013.01); *H04W 28/0257* (2013.01);
(Continued)

(58) Field of Classification Search
CPC ............ H04W 28/0236; H04W 28/02; H04W 28/0257; H04W 28/0263; H04W 28/0268;
(Continued)

(56) References Cited

U.S. PATENT DOCUMENTS 8,331,375 B2   12/2012   Babbar
9,055,612 B2   6/2015   Chaponniere
(Continued)

FOREIGN PATENT DOCUMENTS

EP    3 461 209 A1    3/2019
JP    2014-511168     5/2014
(Continued)

OTHER PUBLICATIONS

International Search Report dated Jul. 31, 2018 issued in Application No. PCT/KR2018/003971.
(Continued)

*Primary Examiner* — Un C Cho
*Assistant Examiner* — Lalita W Pace
(74) *Attorney, Agent, or Firm* — Ked & Associates, LLP

(57) ABSTRACT

Disclosed is technology for applying a more differential QoS, that is, service quality to each communication service by implementing a differential QoS control in a radio section more precisely without any increase in complexity and load compared to a conventional bearer based QoS control method.

20 Claims, 10 Drawing Sheets

(51) Int. Cl.
    *H04W 28/02* (2009.01)
    *H04W 88/08* (2009.01)
(52) U.S. Cl.
    CPC ... *H04W 28/0263* (2013.01); *H04W 28/0268* (2013.01); *H04W 28/10* (2013.01); *H04W 36/0044* (2013.01); *H04W 88/08* (2013.01)
(58) Field of Classification Search
    CPC . H04W 28/10; H04W 36/0044; H04W 88/08; H04W 28/0967; H04W 76/10
    See application file for complete search history.

(56) References Cited

U.S. PATENT DOCUMENTS

| | | | |
|---|---|---|---|
| 9,356,857 | B1 | 5/2016 | Naryanan |
| 9,357,430 | B2 | 5/2016 | Zhao |
| 9,819,469 | B2 | 11/2017 | Horn |
| 2011/0206094 | A1 | 8/2011 | Zhang |
| 2012/0099428 | A1 | 4/2012 | Kamdar |
| 2012/0155398 | A1 | 6/2012 | Oyman |
| 2014/0003328 | A1 | 1/2014 | Midh |
| 2014/0126489 | A1 | 5/2014 | Zakrzewski |
| 2014/0341017 | A1 | 11/2014 | Mutikainen et al. |
| 2015/0003435 | A1 | 1/2015 | Horn et al. |
| 2015/0063101 | A1 | 3/2015 | Touati |
| 2016/0050653 | A1 | 2/2016 | Rastogi |
| 2016/0338102 | A1 | 11/2016 | Nuggehalli |
| 2017/0019816 | A1 | 1/2017 | Yuan |
| 2017/0034749 | A1 | 2/2017 | Chandramouli |
| 2017/0127438 | A1 | 5/2017 | Ludwig |
| 2017/0215122 | A1 | 7/2017 | Nigam et al. |
| 2017/0324652 | A1 | 11/2017 | Lee |
| 2018/0049218 | A1 | 2/2018 | Hapsari |
| 2019/0166014 | A1 | 5/2019 | Li |
| 2019/0261211 | A1 | 8/2019 | Wu |
| 2019/0357075 | A1 | 11/2019 | Van Der Velde |
| 2019/0373661 | A1 | 12/2019 | Kousaridas |
| 2020/0077317 | A1 | 3/2020 | Sharma |
| 2020/0128452 | A1 | 4/2020 | Centonza |
| 2020/0196183 | A1 | 6/2020 | Mehta |

FOREIGN PATENT DOCUMENTS

| | | |
|---|---|---|
| JP | 2015-526999 | 9/2015 |
| JP | 2019-531620 | 10/2019 |
| JP | 6872006 | 5/2021 |
| KR | 10-2005-0089627 | 9/2005 |
| KR | 10-2008-0098302 | 11/2008 |
| KR | 10-0909105 | 7/2009 |
| KR | 10-2010-0072200 | 6/2010 |
| KR | 10-2014-0036901 | 3/2014 |
| KR | 10-2016-0028446 | 3/2016 |
| WO | WO 2012/126761 | 9/2012 |
| WO | WO 2014/017872 | 1/2014 |
| WO | WO 2016/163808 | 10/2016 |
| WO | WO 2018/074703 | 4/2018 |

OTHER PUBLICATIONS

Korean Office Action dated Dec. 10, 2018 issued in Application No. 10-2017-0094896 (English translation attached).
Nokia et al: "Radio Bearer Management Principles", 3GPP Draft; R2-164789 DRB Management, $3^{rd}$ Generation Partnership Project (3GPP), Mobile Competence Centre; 650, Route Des Lucioles; F-06921 Sophia-Antipolis Cedex; France, vol. RAN WG2, No. Gothenburg, Sweden; Aug. 22, 2016-Aug. 26, 2016 Aug. 21, 2016 (Aug. 21, 2016), XP051140888.
ZTE Corporation et al: "New Qos Architecture", 3GPP Draft; S2-161755 New Qos Architecture, $3^{rd}$ Generation Partnership Project (3GPP), Mobile Competence Centre; 650, Route Des Lucioles; F-06921 Sophia-Antipolis Cedex; France, vol. SA WG2, No. Sophia Antipolis, France; Apr. 11, 2016-Apr. 15, 2016 Apr. 5, 2016 (Apr. 5, 2016), XP051086719.
Samsung: "Extending Reflective Qos scheme to support for Asymmetric Qos", 3GPP Draft; S2-166452 Asymmetric Qos, $3^{rd}$ Generation Partnership Project (3GPP), Mobile Competence Centre; 650, Route Des Lucioles; F-06921 Sophia-Antipolis Cedex; France, vol. SA WG2, No. Reno, Nevada, U.S.; Nov. 14, 2016-Nov. 18, 2016 Nov. 8, 2016 (Nov. 8, 2016), XP051199431.
Huawei et al: "Qos Flow to DRB Mapping", 3GPP Draft; R2-1701205, $3^{rd}$ Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb. 17, 2017 Feb. 4, 2017 (Feb. 4, 2017), XP051223422.
Zte et al: "Further discussion on the new UP protocol layer for Qos", 3GPP Draft; R2-1701119 Further Discussion on the new UP protocol layer for Qos, $3^{rd}$ Generation Partnership Project (3GPP), Mobile Competence Centre; 650, Route Des Lucioles; F-06921 Sophia-Antipolis, vol. RAN WG2, No. Athens, Greece; Feb. 13, 2017-Feb. 17, 2017 Feb. 4, 2017 (Feb. 4, 2017), XP051223372.
European Search Report dated Apr. 17, 2020 issued in Application No. 18839180.9.
U.S. Office Action dated Jun. 1, 2020 issued in parent U.S. Appl. No. 16/348,938.
U.S. Final Office Action dated Sep. 30, 2020 issued in parent U.S. Appl. No. 16/348,938.
U.S. Office Action dated Mar. 4, 2021 issued in parent U.S. Appl. No. 16/348,938.
Japanese Office Action (with English translation) dated May 27, 2021 issued in JP Application No. 2019-524314.
U.S. Final Office Action dated Jul. 8, 2021 issued in parent U.S. Appl. No. 16/348,938.
Japanese Notice of Allowance dated Oct. 26, 2021 issued in JP Application No. 2019-524314.
U.S. Notice of Allowance dated Dec. 1, 2021 issued in parent U.S. Appl. No. 16/348,938.
Nokia, "Radio Bearer Operation," 3GPP TSG-RAN WG2 Ad-hoc on LTE (R2-061845, Cannes France, Jun. 27-30, 2006, pp. 1-9 Year: 2006.
ZTE, "New QoS Architecture," SA WG2 Meeting #114 (S2-161755) Apr. 11-15, 2016, Sophia Antipolis, France, pp. 1-3 (Year 2016).
Ericsson, "QoS Control in the 3GPP Evolved Packet System," IEEE Communications Magazine, Feb. 2009, pp. 76-83 (Year 2009).
Nokia Research Center, "Supporting Packet-Data QoS in Next-Generation Cellular Networks," IEEE Communications Magazine, Feb. 2001, pp. 180-188 (Year: 2001).

BASE STATION, AND QOS CONTROL METHOD OF WIRELESS SECTION

CROSS-REFERENCE TO RELATED APPLICATIONS

This application is a Continuation Application of U.S. patent application Ser. No. 16/348,938 filed May 10, 2019, which a U.S. National Stage Application under 35 U.S.C. § 371 of PCT Application No. PCT/KR2018/003971, filed Apr. 4, 2018, which claims priority to Korean Patent Application No. 10-2017-0094896, filed Jul. 26, 2017, whose entire disclosures are hereby incorporated by reference.

BACKGROUND

1. Field

The present disclosure relates to a QoS control technology for transmitting packet of a communication service at different QoS levels.

More particularly, the present disclosure relates to a technology for implementing differential QoS control in a radio section more precisely without any increase in complexity and load compared to a conventional bearer based QoS control method.

2. Background

In a mobile communication system, a Quality of Service (QoS) level varies depending on a media type of a communication service used by a terminal (user). The mobile communication system provides QoS control for transmitting a packet of a communication service with a QoS level suitable for a media type.

A QoS control method provided by an LTE network is an EPS bearer based QoS control method (hereinafter, a bearer based QoS control method).

In order to use a communication service in the LTE network, the terminal (user) generates an EPS bearer (hereinafter, called a bearer) for transmitting data. The EPS bearer, that is, the bearer may be a tunnel generated from a terminal to a P-GW including a radio section for connecting the terminal and a Base Station (BS) and a wired section for connecting the BS, an S-GW and the P-GW.

Data of the user (terminal) is transmitted in the form of an IP-based packet through the tunnel, that is, the bearer, and a traffic flow according to packet transmission is referred to as a service flow.

Conventionally, since communication service types provided to terminals (users) were relatively limited, the bearer based QoS control method was used where several types of communication services are grouped and the QoS is guaranteed (applied) on the logical basis of "bearer".

Accordingly, service flows transmitted through one bearer are all transmitted with the same QoS (QoS level of the bearer) since the conventional bearer based QoS control method defines a QoS level (QoS parameter) for each bearer and guarantees the QoS on the basis of bearer.

As a result, the conventional bearer based QoS control method has an advantage in that complexity of the QoS control can be reduced but has a limit in that differential QoS cannot be applied to each service flow belonging to one bearer.

As described above, the limit of the conventional bearer based QoS control method is not a big problem in a situation in which types of communication services are relatively limited.

However, in a current or future situation (for example, 5G) in which various types of communication services are developed/introduced rapidly, it is required to improve the limit of the conventional bearer based QoS control method.

Therefore, the present disclosure proposes a method of implementing the differential QoS control in a radio section more precisely without any increase in complexity and load compared to the conventional bearer based QoS control method.

BRIEF DESCRIPTION OF THE DRAWINGS

The embodiments will be described in detail with reference to the following drawings in which like reference numerals refer to like elements wherein.

DETAILED DESCRIPTION

Hereinafter, embodiments of the present disclosure will be described with reference to the accompanying drawings.

Prior to a detailed description of the present disclosure, the conventional bearer based QoS control method will be described with reference to FIG. 1.

The conventional bearer based QoS control method is a method of grouping several types of communication services and applying (guaranteeing) a QoS on the logical basis of "bearer".

Figure 1:
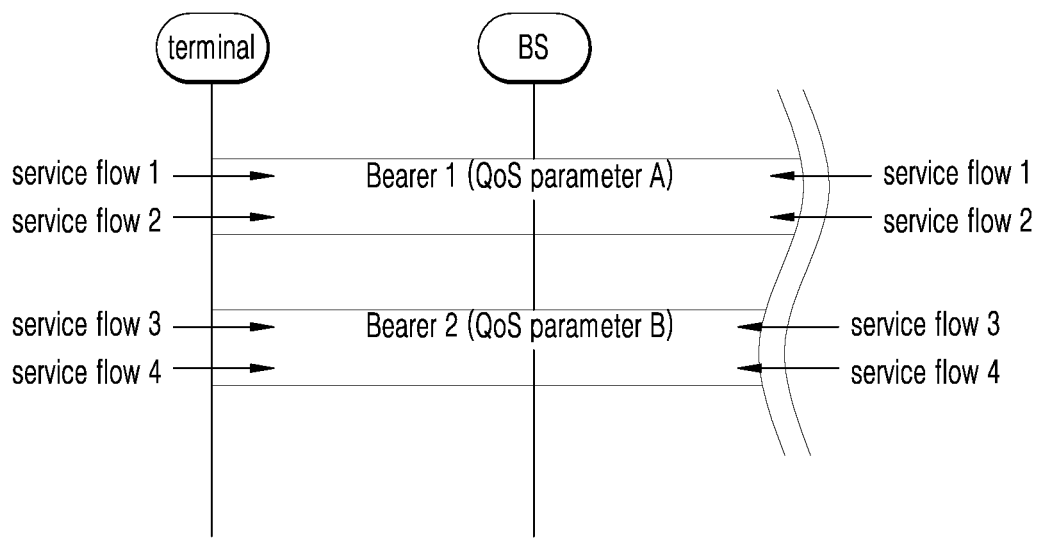
FIG. 1 illustrates an example of a conventional bearer based QoS control method.

As illustrated in FIG. 1, in order to use a communication service, a terminal (user) generates EPS bearers (hereinafter, referred to as bearers), that is, bearers 1 and 2 for guaranteeing QoS required by the communication service which the terminal (user) desires to use.

Each of bearers 1 and 2 may be a default bearer or a dedicated bearer.

In FIG. 1, it is assumed that service flow 1 of communication service 1 and service flow 2 of communication service 2 used by the terminal belong to one bearer (bearer 1), and service flow 3 of communication service 3 and service flow 4 of communication service 4 used by the terminal belong to one bearer (bearer 2).

Under such an assumption, as illustrated in FIG. 1, the same QoS, that is, a QoS level (QoS parameter A) of bearer 1 is applied to both service flows 1 and 2 transmitted through bearer 1, and the same QoS, that is, a QoS level (QoS parameter B) of bearer 2 is applied to both service flows 3 and 4 transmitted through bearer 2.

As a result, the conventional bearer based QoS control method has an advantage in that complexity in the QoS control can be reduced through application of the QoS on the logical basis of bearer, but has a limit in that differential QoS cannot be applied to each service flow belonging to one bearer.

Accordingly, the present disclosure proposes a method of realizing the differential QoS control more precisely than the conventional bearer based QoS control method. Particularly, the present disclosure is to realize the method in a radio section which may be a core of the QoS control.

However, when the differential QoS control is realized more precisely, complexity and load of the QoS control may increase compared to the conventional bearer based QoS control method.

Accordingly, the present disclosure proposes a method (hereinafter, referred to as a radio section QoS control method) of minimizing an increase in complexity and load compared to the conventional bearer based QoS control method and implementing the differential QoS control in a radio section more precisely.

Hereinafter, an apparatus, that is, a BS apparatus for implementing the radio section QoS control method proposed by the present disclosure will be described in detail.

First, the flow of the radio section QoS control method according to an embodiment of the present disclosure is described with reference to FIG. 2.

A core network 20 transfers a mapping rule for converting a QoS parameter, which the core network 20 applies to a service flow, into a dedicated radio section QoS parameter to a BS 100 in S1.

At this time, the core network 20 may support the conventional bearer based QoS control method.

In this case, the QoS parameter which the core network 20 applies to the service flow may be the same as a QoS parameter (QoS level) of a bearer to which the corresponding service flow belongs.

Accordingly, when the core network 20 supports the conventional bearer based QoS control method, the mapping rule may be for converting a QoS parameter into a dedicated radio section QoS parameter with respect to each QoS parameter (each bearer based QoS parameter) applied to a service flow.

Further, the core network 20 may support a service flow based QoS control method that guarantees (applies) a different QoS for each service flow unlike the conventional bearer based QoS control method.

In this case, the QoS parameter which the core network 20 applies to the service flow may be a QoS parameter (QoS level) defined for each service flow.

Accordingly, when the core network 20 supports the service flow based QoS control method, the mapping rule may be a mapping rule for converting a QoS parameter into a dedicated radio section QoS parameter with respect to each QoS parameter (each service flow based QoS parameter) applied to a service flow.

However, the radio section QoS control method proposed by the present disclosure may obtain the same effect described below through the same configuration described below regardless of whether the core network 20 supports the bearer based QoS control method or the service flow based QoS control method.

Accordingly, the following description of the present disclosure will be made without distinction about whether the core network 20 supports the bearer based QoS control method or the service flow based QoS control method for convenience of description.

The BS 100 may set a mapping rule transferred from the core network 20 in S2.

At this time, information on the mapping rule set by and stored in the BS 100 may have a form of a mapping table in which a dedicated radio section QoS parameter is mapped to each QoS parameter (bearer based QoS parameter or service flow based QoS parameter) applied to the service flow by the core network 20.

The BS 100 inserts QoS control information into an RRC message and provides the RRC message to the terminal 10 in a Radio Resource Control (RRC) setup process (S3) with the terminal 10 accessing the BS 100.

The QoS control information is information for allowing the terminal 10 to identify a dedicated radio section QoS parameter which the BS 100 applies to each service flow.

For example, QoS control information may include a dedicated radio section QoS parameter applied to a service flow which the BS 100 provides to the terminal 10.

Accordingly, the terminal 10 may set the QoS control information provided from the BS 100 in S4.

When the BS 100 receives a packet to be transmitted to the terminal 10 from the core network 20 in S5, the BS 100 identifies a QoS parameter (for example, QoS parameter A) applied to a service flow of this packet.

Further, the BS 100 identifies a dedicated radio section QoS parameter mapped to the QoS parameter applied to the service flow in the set/stored mapping table in S6.

That is, the BS 100 converts a QoS level of the core network 20 into a dedicated radio section QoS level by mapping the QoS parameter (for example, QoS parameter A), which the core network 20 applies to this packet (service flow), to the dedicated radio section QoS parameter (for example, QoS parameter 1) in S6.

Thereafter, before transmission of this packet to the terminal 10, the BS 100 applies the identified dedicated radio section QoS parameter (for example, QoS parameter 1) to the packet and transmits the packet in S7.

That is, the BS 100 converts the QoS level which the core network 20 applies into the dedicated radio section QoS level and transmits this packet.

When an uplink packet is generated in S8, the terminal 10 may equally apply the dedicated radio section QoS parameter (for example, QoS parameter 1) on the basis of preset QoS control information, which the BS 100 applies in downlink of this service flow, and transmit the uplink packet in S9.

As described above, the terminal 10 may transmit the uplink packet at the dedicated radio section QoS level which is the same as that in the downlink on the basis of the preset QoS control information.

Upon receiving the uplink packet form the terminal 10, the BS 100 inversely performs QoS mapping of step S6 to convert the dedicated radio section QoS level into the QoS level of the core network 20 and transmit this uplink packet in S10.

That is, upon receiving the uplink packet from the terminal 10, the BS 100 map the dedicated radio section QoS parameter (for example, QoS parameter 1) to the QoS parameter (for example, QoS parameter A) which the core network 20 applies and then applies the QoS parameter (for example, QoS parameter A) to transmit the uplink packet in S10.

Hereinafter, the apparatus, that is, the BS apparatus for implementing the radio section QoS control method according to an embodiment of the present disclosure will be described in detail with reference to FIG. 3.

Figure 2:
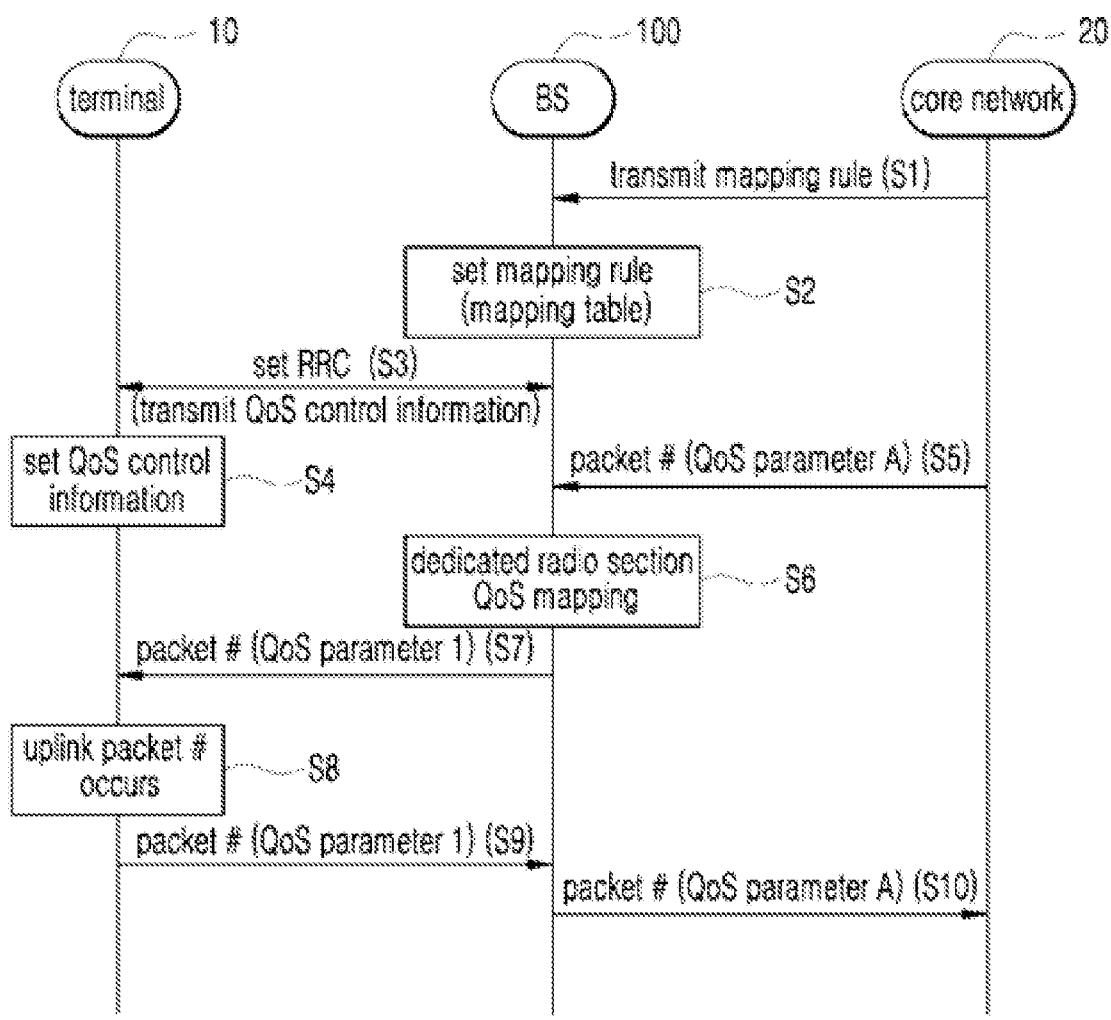
FIG. 2 illustrates an example of flow for implementing a radio section QoS control method according to an embodiment of the present disclosure.

For convenience of description, the reference numeral of the BS 100 in FIG. 2 will be equally used.

Figure 3:
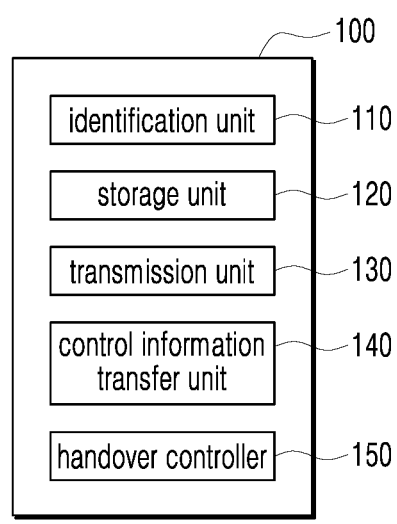
FIG. 3 is a block diagram illustrating the configuration of a BS apparatus according to an embodiment of the present disclosure.

As illustrated in FIG. 3, the BS apparatus 100 according to the present disclosure includes an identification unit 110 and a transmission unit 130.

With respect to a packet to be transmitted to the terminal, the identification unit 110 performs, on the basis of a QoS parameter applied to a service flow, a function of identifying a dedicated radio section QoS parameter mapped to the QoS parameter.

The transmission unit 130 performs a function of converting the QoS level which the core network applies into the dedicated radio section QoS level and transmitting a packet by applying the dedicated radio section QoS parameter identified by the identification unit 110.

Here, the terminal is a terminal accessing the BS apparatus 100 and using a communication service and may simultaneously use a plurality of communication services through the BS apparatus 100.

The following description will be made based on the terminal 10 illustrated in FIG. 2.

Upon receiving the packet to be transmitted to the terminal 10 from the core network 20, the identification unit 110 identifies the QoS parameter applied to the service flow of the corresponding packet.

For example, a header of the downlink packet received from the core network 20 may include the QoS parameter which the core network 20 applies to the service flow of the corresponding packet.

In this case, the identification unit 110 may extract/identify the QoS parameter included in the header of the packet to be transmitted to the terminal 10 so as to identify the QoS parameter applied to the service flow of the packet.

Alternatively, the header of the downlink packet received from the core network 20 may include a separate QoS identifier for identifying the QoS parameter, which the core network 20 applies to the service flow of the corresponding packet.

In this case, the identification unit 110 may extract/identify the QoS parameter included in the header of the packet to be transmitted to the terminal 10 so as to identify the QoS parameter applied to the service flow of the packet.

Alternatively, the BS apparatus 100 may store policy information indicating which QoS parameter (the bearer based QoS parameter or the service flow based QoS parameter) will be applied to each service flow by the core network 20.

In this case, the identification unit 110 may identify the service flow of the packet on the basis of 5-tuple, that is, a source IP, a destination IP, a source Port, a destination Port, and a protocol ID within the header of the packet to be transmitted to the terminal 10 and identify the QoS parameter which the core network 20 will apply to the identified service flow on the basis of the policy information so as to identify the QoS parameter applied by the core network 20 to the service flow of the packet.

In addition, when the QoS parameter applied to the service flow of the packet is identified, the identification unit 110 identifies a dedicated radio section QoS parameter mapped to the QoS parameter.

To this end, the BS apparatus 100 may further include a storage unit 120 configured to store a mapping table in which the dedicated radio section QoS parameter is mapped to each QoS parameter which the core network 20 applies to the service flow.

More specifically, a predetermined specific device (not shown) within the core network 20 transfers, to the BS apparatus 100, a mapping rule for converting the QoS parameter applied to the service flow into the dedicated radio section QoS parameter.

At this time, the core network 20 may directly support the conventional bearer based QoS control method.

In this case, the QoS parameter which the core network 20 applies to the service flow may be the same as a QoS parameter (QoS level) of a bearer to which the corresponding service flow belongs.

Accordingly, when the core network 20 supports the conventional bearer based QoS control method, with respect to each QoS parameter (each bearer based QoS parameter) applied to a service flow, the mapping rule may be a mapping rule for converting a QoS parameter into a dedicated radio section QoS parameter.

Further, the core network 20 may support a service flow based QoS control method that guarantees (applies) a different QoS for each service flow unlike the conventional bearer based QoS control method.

In this case, the QoS parameter which the core network 20 applies to the service flow may be a QoS parameter (QoS level) defined for each service flow.

Accordingly, when the core network 20 supports the service flow based QoS control method, with respect to each QoS parameter (each service flow based QoS parameter) applied to a service flow, the mapping rule may be a mapping rule for converting a QoS parameter into a dedicated radio section QoS parameter.

However, the radio section QoS control method proposed by the present disclosure may obtain the same effect described below through the same configuration described below regardless of whether the core network 20 supports the bearer based QoS control method or the service flow based QoS control method.

For convenience of description, the following description will be made without distinction about whether the core network 20 supports the bearer based QoS control method or the service flow based QoS control method.

The BS apparatus 100 sets the mapping rule transferred from the core network 20, and the storage unit 120 stores a mapping table in which the dedicated radio section QoS parameter is mapped to each QoS parameter (the bearer based QoS parameter or the service flow based QoS parameter), which the core network 20 applies to the service flow in a process of setting the mapping rule.

When the QoS parameter applied to the service flow of the packet is identified, the identification unit 110 identifies the dedicated radio section QoS parameter mapped to the QoS parameter in the mapping table stored in the storage unit 120.

That is, the identification unit 110 converts a QoS level on the core network 20 into a dedicated radio section QoS level by mapping the QoS parameter which the core network 20 applies to this packet (service flow) to the dedicated radio section QoS parameter.

The transmission unit 130 applies the dedicated radio section QoS parameter identified by the identification unit 110 to transmit this packet to the terminal 10 and converts the QoS level which the core network 20 applies into the dedicated radio section QoS level to transmit this packet.

That is, when transmitting a downlink packet through a radio section, the transmission unit 130 applies the dedicated radio section QoS parameter (QoS level) instead of the QoS parameter (QoS level) which the core network 20 applies to the service flow of the corresponding packet to transmit the downlink packet.

As described above, the present disclosure may separately implement the QoS control of the radio section between the terminal and the access end (BS) regardless of the QoS control method between the access end and the core network among all sections from the terminal to the core network, which is unlike the conventional QoS control method of applying the QoS to all sections (bearers) from the terminal to the core network.

That is, in the radio section QoS control method according to the present disclosure, a most sensitive radio section which can be a core of the QoS control among all sections from the terminal to the core network is defined on the basis of a Data Radio Bearer (DRB) and thus the differential QoS control may be independently implemented in the radio section on the basis of DRB.

The radio section QoS control method according to the present disclosure has been described based on downlink traffic.

In order to apply the radio section QoS control method according to the present disclosure to uplink traffic, a process of providing information (QoS control information) required for the radio section QoS control to the terminal is needed. But the process may increase complexity and load as the QoS control is performed more precisely.

Accordingly, in the present disclosure, the information (QoS control information) required for the radio section QoS control should be provided to the terminal while the increase in complexity and load is minimized.

Specifically, as illustrated in FIG. 3, the BS apparatus 100 according to the present disclosure further includes a control information transfer unit 140.

The control information transfer unit 140 transmits an RRC message including QoS control information for identifying the dedicated radio section QoS parameter identified by the identification unit 110 to the terminal 10.

More specifically, when the terminal 10 accesses the BS apparatus 100 to use a communication service, a Radio Resource Control (RRC) setup process is performed between the BS apparatus 100 and the terminal 10.

At this time, the control information transfer unit 140 inserts QoS control information into the RRC message during the RRC setup process and provides the RRC message to the terminal 10.

The QoS control information is information for allowing the terminal 10 to identify the dedicated radio section QoS parameter which the BS apparatus 100 applies to each service flow.

For example, the QoS control information may include a dedicated radio section QoS parameter applied to a service flow which the BS apparatus 100 provides to the terminal 10.

More specifically, the QoS control information may be information for identifying the dedicated radio section QoS parameter which the BS apparatus 100 applies to each service flow, the information having a form in which 5-tuple (a source IP, a destination IP, a source port, a destination port, and a protocol ID) used for distinguishing service flows and dedicated radio section QoS parameters are mapped.

The terminal 10 may set QoS control information provided from the BS apparatus 100 and thus know information (QoS control information) required for the radio section QoS control.

The terminal 10 may apply the dedicated radio section QoS parameter which is the same as that which the BS apparatus 100 applies in the downlink of this service flow on the basis of the QoS control information to transmit an uplink packet.

That is, the terminal 10 may transmit the uplink packet at the dedicated radio section QoS level which is the same as that of the downlink on the basis of the set QoS control information provided from the BS apparatus 100.

As described above, in the present disclosure, it is possible to minimize an increase in complexity and load through the use of only minimum messages and provide information (QoS control information) required for the radio section QoS control to the terminal by providing the QoS control information to the terminal in the RRC setup process.

Meanwhile, on the basis of the definition of a mapping rule (mapping table), the radio section QoS control method proposed by the present disclosure may obtain different performances through the QoS control in the radio section.

Hereinafter, in the radio section QoS control method, various embodiments according to the definition of the mapping rule (mapping table) for the QoS control will be described.

First, an ideal example for the most detailed and differential QoS control may be a 1:1 mapping table of service flow:DRB that can guarantee different dedicated radio section QoS levels (DRBs) for each service flow.

In the case of 1:1 mapping of service flow:DRB, since it is possible to guarantee an independent optimal dedicated radio section QoS level (DRB) for each service flow, the 1:1 mapping of service flow:DRB is the most excellent in the light of a differential QoS control for each service flow.

However, in the case of 1:1 mapping of service flow:DRB, there is a concern about a serious increase in complexity and load compared to the conventional QoS control method because of an overhead due to excessive mapping processing by the access end (BS) and costs due to management of a large number of DRBs.

Accordingly, the present disclosure proposes three embodiments below to define a mapping rule (mapping table) for the QoS control.

However, hereinafter, it is assumed that the core network 20 supports the service flow based QoS control method for convenience of description.

Based on such an assumption, a QoS parameter (QoS level) defined for each service flow may be applied to the service flow received by the core network 20.

According to an embodiment (hereinafter, referred to as a first embodiment) of the three embodiments, M:N mapping of service flow:DRB is proposed (M>N).

According to the first embodiment, in a mapping table, the number of dedicated radio section QoS parameters is larger than the number of QoS parameters.

That is, when it is assumed that the number of service flows received by the core network 20 is M, an M:N mapping rule (mapping table) of service flow:DRB is defined such that M QoS parameters (QoS levels) applied to M service flows, respectively, are mapped to N dedicated radio section QoS parameters (QoS levels) (M>N).

The M:N mapping of service flow:DRB has slightly lower performance than 1:1 mapping but has better performance than the conventional unit QoS control in the light of differential QoS control.

Further, the M:N mapping of service flow:DRB is more excellent than 1:1 mapping in the light of overhead due to mapping processing by the access end (BS) and costs due to DRB management, thereby reducing an increase in complexity and load.

At this time, the relation between M QoS parameters and N dedicated radio section QoS parameters may be determined when the mapping rule (mapping table) is defined.

Meanwhile, according to an embodiment (hereinafter, referred to as a second embodiment) of the three embodiments, M:1 mapping of service flow:DRB is proposed.

According to the second embodiment, in a mapping table, two different QoS parameters are mapped to the one same dedicated radio section QoS parameter.

That is, an M:1 mapping rule (mapping table) of service flow:DRB is defined such that M QoS parameters (QoS levels) applied to M service flows received by the core network 20, respectively, are mapped to one dedicated radio section QoS parameter (QoS level).

At this time, M QoS parameters (QoS levels) applied to M service flows may be QoS parameters (QoS levels) applied to a communication service or an Internet of Things (IoT) service in which the core network 20 periodically transmits a small amount of data equal to or lower than a particular size.

One of the communication services spotlighted in a 5G environment is a communication service, that is, an IoT service in which each of a plurality of remote terminals periodically transmits a small amount of data lower than a particular size, which is collected thereby, to the center (server).

In the IoT service, an IoT service of specific IoT technology (Long Range: LoRa) that supports low speed transmission (<1 kbps) and low power in wide coverage has appeared.

Since the IoT service is specialized in wide coverage/low speed transmission (<1 kbps)/low power/small amount of data, the IoT service puts a larger weight on efficient operation of radio resources compared to a differential QoS control for each service flow in the radio section.

In an embodiment of M:1 of service flow:DRB, M service flows of the IoT service are mapped to the one same dedicated radio section QoS parameter (QoS level) and thus the M:1 mapping is very excellent in the light of overhead due to mapping processing by the access end (BS) and costs due to DRB management and also efficiency in operation of radio resources is high, so that an increase in complexity and load can be reduced and the efficiency of operation of radio resources can be increased.

Meanwhile, according to an embodiment (hereinafter, referred to as a third embodiment) of the three embodiments, 1:N mapping of service flow:DRB is proposed.

According to the third embodiment, in a mapping table, to one service flow to which a particular QoS parameter is applied, dedicated radio section QoS parameters are mapped for each QoS of content included in the service flow.

That is, a 1:N mapping rule (mapping table) of service flow:DRB is defined such that one particular QoS parameter (QoS level) applied to one service flow received by the core network 20 is mapped to N dedicated radio section QoS parameters (QoS levels).

At this time, the particular QoS parameter has a service type of a Non-Guaranteed Bit Rate (GBR) that does not guarantee a bandwidth.

The QoS parameter applied by the core network 20 includes a service type (resource type), a QoS Class Identifier (QCI), and an Allocation and Retention Priority (ARP).

The service type is a parameter indicating a GBR that guarantees a bandwidth or a Non-GBR that does not guarantee a bandwidth in transmission.

The QCI is a parameter indicating a QoS priority through an integer from 1 to 9.

The ARP is a parameter involved in generation or rejection when a request for generating a bearer according to a service flow is made.

Of course, the QoS parameter may include other parameters as well as the above parameters.

Even one service flow, to which the QoS parameter of the non-GRB that does not guarantee the bandwidth is applied, may include packets of each piece of content having different QoS requirements.

In an embodiment of 1:N of service flow:DRB, with respect to one service flow to which a particular QoS parameter of the non-GBR is applied, different dedicated radio section QoS parameters are mapped for each piece of content (identified on the basis of a QoS requirement) included in the service flow, so that the radio section QoS control may be differentially applied in most detailed units.

Particularly, in the third embodiment of 1:N mapping, an element for distinguishing each piece of content (content QoS) included in the service flow is further needed.

Accordingly, in the third embodiment, upon receiving a packet to be transmitted to the terminal 10 from the core network 20, the identification unit 110 identifies a QoS parameter applied to the service flow of the corresponding packet to check whether the QoS parameter is a particular QoS parameter of the non-GBR.

When the QoS parameter is the particular QoS parameter of the non-GBR on the basis of the identification result of the QoS parameter, the identification unit 110 may identify a QoS (QoS requirement) of content on the basis of a Differentiated Services Code Point (DSCP) field for distinguishing a service quality type (DiffServ) in a header of this packet (for example, an IP packet header).

Further, in the mapping table (1:N mapping) according to the third embodiment, the identification unit 110 identifies a dedicated radio section QoS parameter mapped to the QoS (QoS requirement) of the identified content.

In this packet transmission to the terminal 10, the transmission unit 130 applies the dedicated radio section QoS parameter (the dedicated radio section QoS parameter for each piece of content identified on the basis of the QoS (QoS requirement) of content in one service flow) identified by the identification unit 110 and transmits this packet at a dedicated radio section QoS level (for each piece of content within the service flow) converted from the QoS level applied by the core network 20.

In the third embodiment (1:N), by mapping N different dedicated radio section QoS parameters (QoS levels) to each piece of content included in one service flow, the performance may be most excellent compared to the conventional QoS control methods (in a bearer basis or in a service flow basis) in the light of differential QoS control.

As described above, according to embodiments of the present disclosure, it is possible to independently realize the DRB based QoS control in the radio section by separately implementing the QoS control of the radio section between the terminal and the access end (BS) regardless of the QoS control method between the access end and the core network among all sections from the terminal to the core network.

Furthermore, according to embodiments of the present disclosure, through various embodiments defining the mapping rule (mapping table), it is possible to acquire the QoS control performance while minimizing an increase in complexity and load concerned due to the independent radio section QoS control and to expect an effect of increasing operation efficiency of radio resources.

According to the radio section QoS control method according to the present disclosure, it is possible to derive an effect of applying more differential QoS (quality of service) for each communication service by implementing the differential QoS control in the radio section more precisely without any increase in complexity and load compared to a conventional bearer based QoS control method.

Hereinafter, the radio section QoS control method according to various embodiments of the present disclosure will be described with reference to FIGS. 4 to 9.

However, the radio section QoS control method proposed by the present disclosure is implemented by the BS 100, and thus hereinafter will be referred to as a radio section QoS control method of the BS 100 for convenience of description.

First, the radio section QoS control method according to a first embodiment of the present disclosure will be described below with reference to FIGS. 4 and 5.

Figure 4:
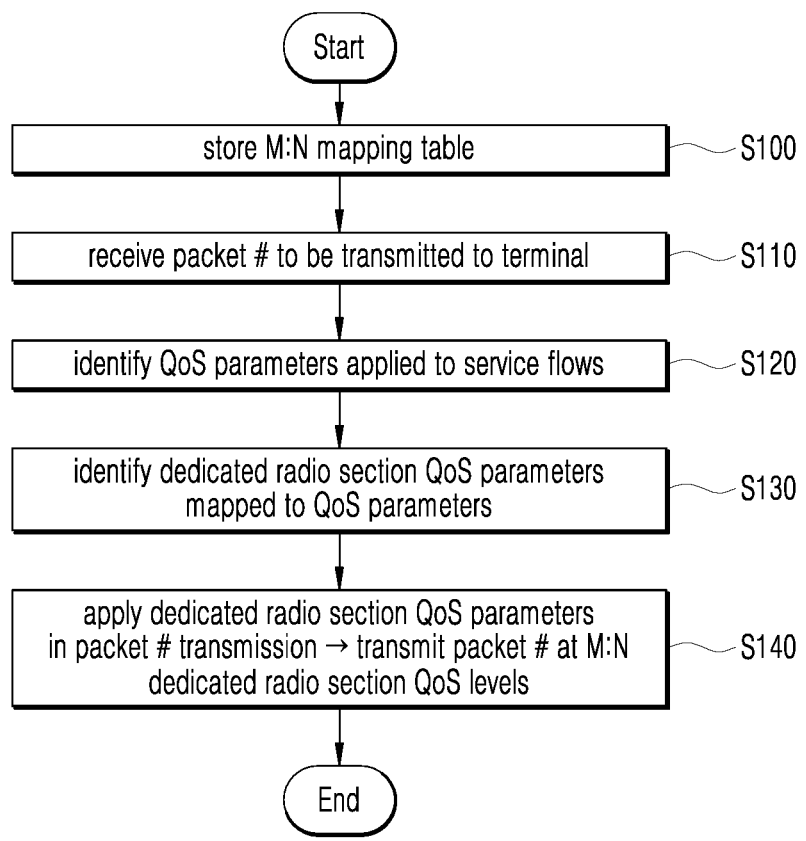
FIGS. 4 and 5 are control flowcharts illustrating a radio section QoS control method according to an embodiment of the present disclosure.

As illustrated in FIG. 4, in the radio section QoS control method according to the present disclosure, that is, the radio section QoS control method of the BS 100, a mapping table according to the first embodiment, that is, an M:N mapping table of service flow:DRB is stored in S100.

In the radio section QoS control method of the BS 100, when a packet to be transmitted to the terminal 10 is received in S110, QoS parameters applied to service flows of the corresponding packet, that is, QoS parameters applied by the core network 20 are identified in S120.

In the radio section QoS control method of the BS 100, when the QoS parameters are identified in S120, dedicated radio section QoS parameters mapped to the QoS parameters are identified in the M:N mapping table in S130.

In the radio section QoS control method of the BS 100, the dedicated radio section QoS parameters identified in S130 may be applied to transmit this packet the terminal 10 and this packet may be transmitted at a dedicated radio section QoS level converted from the QoS level applied by the core network 20 in S140.

Figure 5:
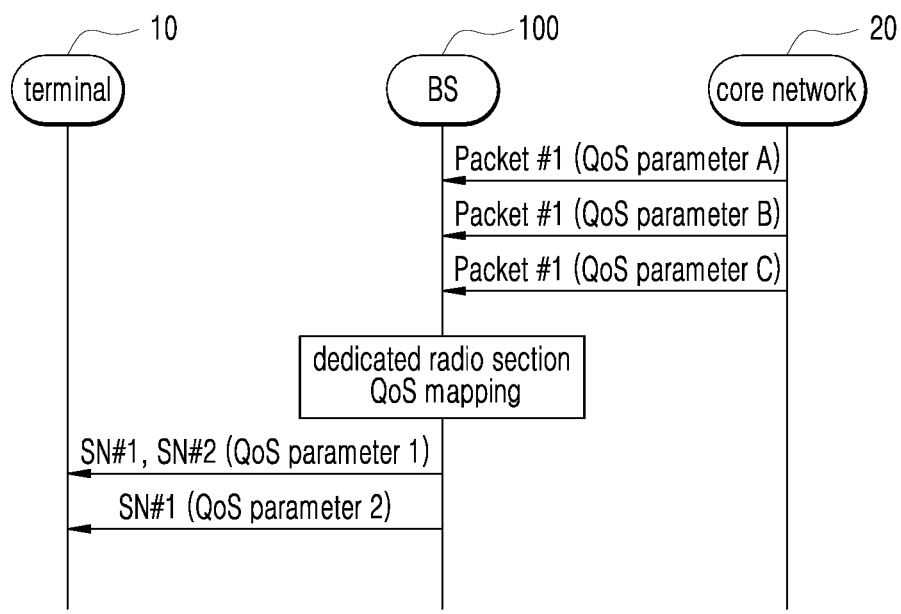

Referring to FIG. 5, it is assumed that packets of service flows 1, 2, and 3 to which different QoS parameters A, B, and C are applied are received.

For example, packet #1 of service flow 1 to which QoS parameter A is applied, packet #1 of service flow 2 to which QoS parameter B is applied, and packet #1 of service flow 3 to which QoS parameter C is applied may be received.

In this case, after identifying QoS parameters A, B, and C applied to service flows of the respective packets, the BS 100 identifies dedicated radio section QoS parameters mapped to QoS parameters A, B, and C in the M:N mapping table to perform dedicated radio section QoS mapping.

At this time, in the M:N mapping table, it is assumed that QoS parameters A and B are mapped to dedicated radio section QoS parameter 1, and QoS parameter C is mapped to dedicated radio section QoS parameter 2.

In this case, the BS 100 applies dedicated radio section QoS parameter 1 to packet #1 of service flow 1 and packet #1 of service flow 2 transmitted to the terminal 10 and transmits SN #1 (packet #1 of service flow 1) and SN #2 (packet #1 of service flow 2).

Further, the BS 100 applies dedicated radio section QoS parameter 2 to packet #1 of service flow 3 transmitted to the terminal 10 and transmits SN #1 (packet #1 of service flow 3).

The BS 100 may transmit the packets of different service flows 1, 2, and 3 at an M:N dedicated radio section QoS level obtained by converting the QoS level which the core network 20 applies into the dedicated radio section QoS level by transmitting SN #1 (packet #1 of service flow 1) and SN #2 (packet #1 of service flow 2) to which dedicated radio section QoS parameter 1 is applied and SN #1 (packet #1 of service flow 3) to which dedicated radio section QoS parameter 2 is applied.

The packets transmitted between the core network 20 and the BS 100 are assigned packet numbers (#N, N=1, 2, 3, . . . ) based on service flows of the corresponding packets.

The packets transmitted between the BS 100 and the terminal 10 are assigned sequence numbers (SN #N, N=1, 2, 3, . . . ) based on DRBs (dedicated radio section QoS levels) at which the corresponding packets are transmitted.

Subsequently, the radio section QoS control method according to the second embodiment of the present disclosure will be described with reference to FIGS. 6 and 7.

Figure 6:
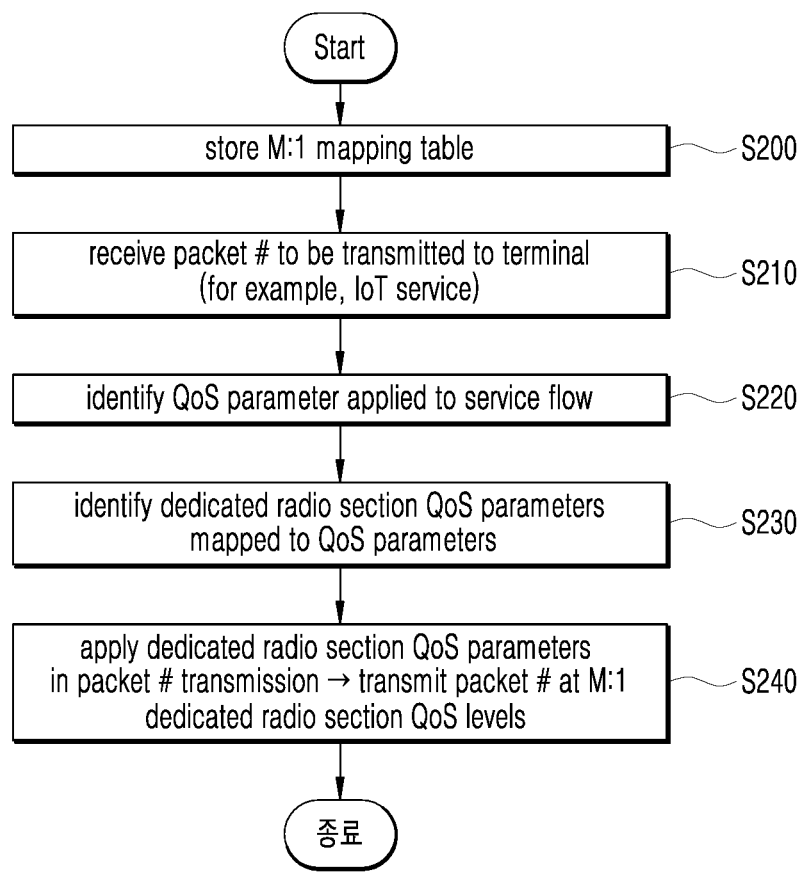
FIGS. 6 and 7 are control flowcharts illustrating a radio section QoS control method according to an embodiment of the present disclosure.

As illustrated in FIG. 6, in the radio section QoS control method of the BS 100 according to the present disclosure, a mapping table according to the second embodiment, that is, an M:1 mapping table of service flow:DRB is stored in S200.

In the radio section QoS control method of the BS 100, when a packet to be transmitted to the terminal 10 is received in S210, QoS parameters applied to service flows of the corresponding packet, that is, QoS parameters applied by the core network 20 are identified in S220.

In the radio section QoS control method of the BS 100, when the QoS parameters are identified in S220, dedicated radio section QoS parameters mapped to the QoS parameters are identified in the M:N mapping table in S230.

In the radio section QoS control method of the BS 100, the dedicated radio section QoS parameters identified in S230 may be applied to transmit this packet the terminal 10 and this packet may be transmitted at a dedicated radio section QoS level converted from the QoS level applied by the core network 20 in S240.

Figure 7:
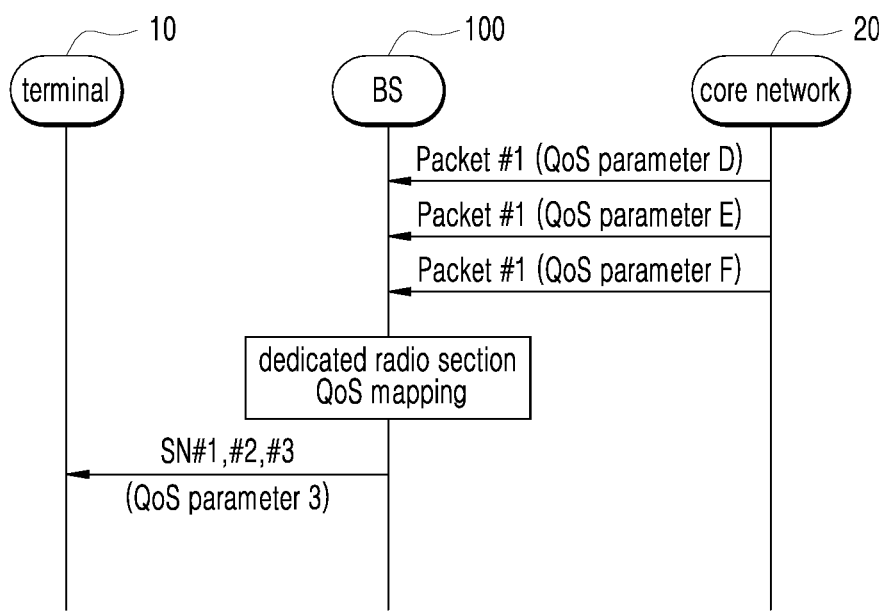

Referring to FIG. 7, it is assumed that packets 1, 2, and 3 of service flows to which different QoS parameters D, E, and F are applied are received.

For example, packet #1 of service flow 4 to which QoS parameter D is applied, packet #1 of service flow 5 to which QoS parameter E is applied, and packet #1 of service flow 6 to which QoS parameter F is applied may be received.

In this case, after identifying QoS parameters D, E, and F applied to service flows of the respective packets, the BS 100 identifies dedicated radio section QoS parameters mapped to QoS parameters D, E, and F in the M:1 mapping table to perform dedicated radio section QoS mapping.

At this time, it is assumed that service flows 4, 5, and 6 are for IoT services specialized in wide coverage/low speed transmission (<1 kbps)/low power/small amount of data.

Further, it is assumed that QoS parameters D, E, and F applied to the IoT services are mapped to dedicated radio section QoS parameter 3 in the M:1 mapping table.

In this case, the BS 100 may apply dedicated radio section QoS parameter 3 to packet #1 of service flow 4, packet #1 of service flow 2, and packet #1 of service flow 6 transmitted to the terminal 10 and transmit SNs #1, #2, and #3 (packets #1 of service flows 4, 5, and 6).

The BS 100 may transmit the packets of different service flows 4, 5, and 6 at the M:1 dedicated radio section QoS level obtained by converting the QoS level applied by the core network 20 into the dedicated radio section QoS level by transmitting SNs #1, #2, and #3 (packets #1 of service flows 4, 5, and 6) to which dedicated radio section QoS parameter #3 is applied.

Subsequently, the radio section QoS control method according to the third embodiment of the present disclosure will be described with reference to FIGS. 8 and 9.

Figure 8:
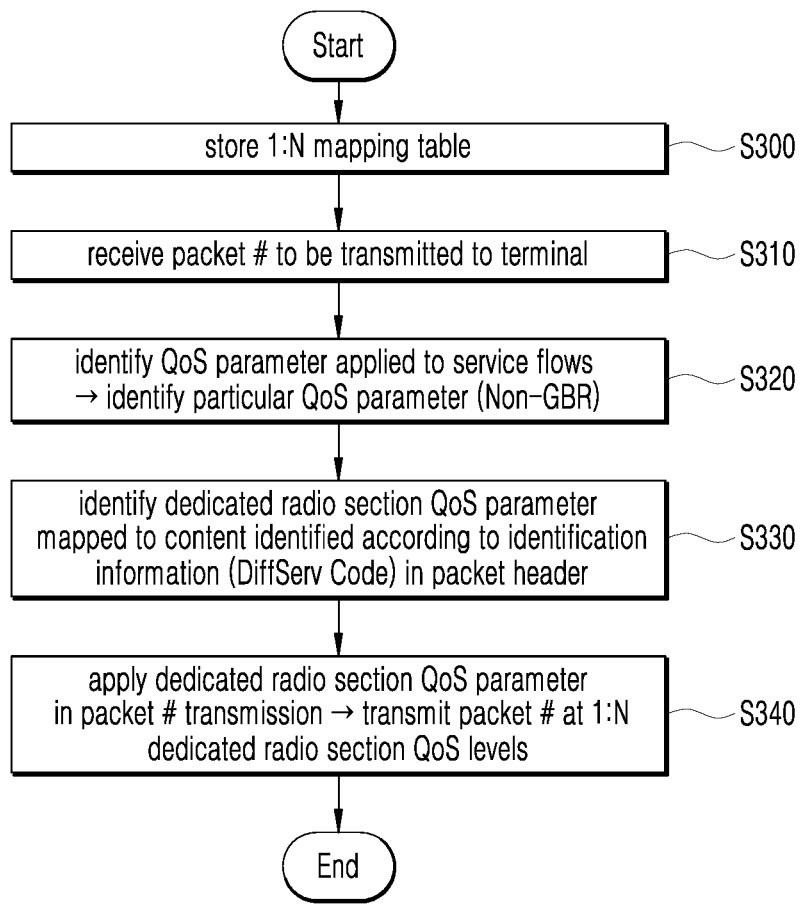
FIGS. 8 and 9 are control flowcharts illustrating a radio section QoS control method according to an embodiment of the present disclosure.

As illustrated in FIG. 8, in the radio section QoS control method of the BS 100 according to the present disclosure, a mapping table according to the third embodiment, that is, a 1:N mapping table of service flow:DRB is stored in S300.

In the radio section QoS control method of the BS 100, when a packet to be transmitted to the terminal 10 is received in S310, a QoS parameter applied to a service flow of the corresponding packet, that is, a QoS parameter applied by the core network 20 is identified in S320.

At this time, in the radio section QoS control method of the BS 100, when the QoS parameter identified in S320 is a particular QoS parameter of a non-GBR, a QoS (QoS requirement) of content may be identified on the basis of a Differentiated Services Code Point (DSCP) field for distinguishing a service quality type (DiffServ) in a header of this packet (for example, an IP packet header).

Further, in the radio section QoS control method of the BS 100, dedicated radio section QoS parameters mapped to the QoS (QoS requirement) of content identified on the basis of the DSCP field are identified in the 1:N mapping table in S330.

According to the radio section QoS control method of the BS 100, in this packet transmission to the terminal 10, the dedicated radio section QoS parameters (the dedicated radio section QoS parameters for each piece of content identified on the basis of the QoS (QoS requirement) of content in one service flow) identified in S330 are applied to transmit this packet to the terminal 10, and this packet is transmitted at dedicated radio section QoS levels (for each piece of content within the service flow) converted from the QoS level applied by the core network 20 in S340.

Figure 9:
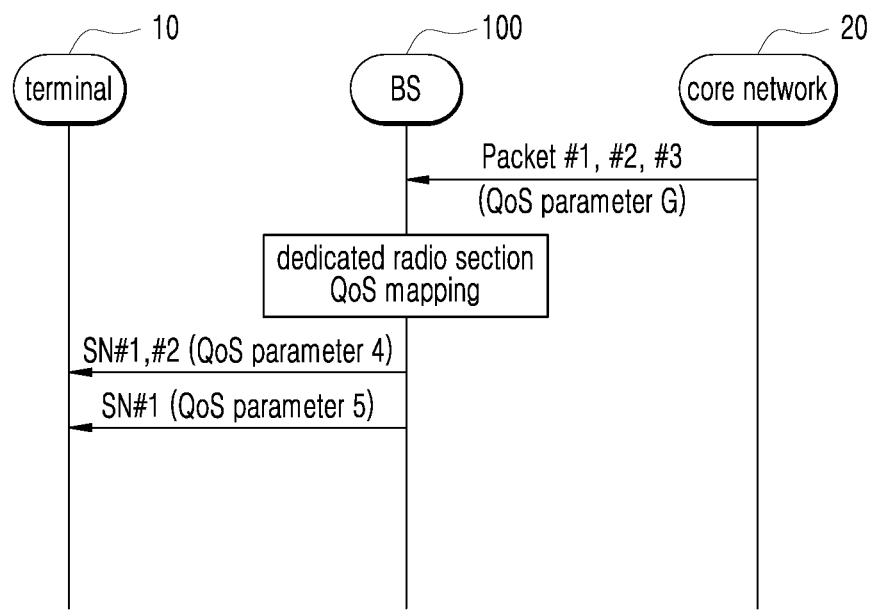

Referring to FIG. 9, it is assumed that packets 1, 2, and 3 of service flow 7 to which a QoS parameter (non-GBR) is applied are received.

In this case, when QoS parameter G applied to service flow 7 of packets 1, 2, and 3 is identified and QoS parameter G is a particular QoS parameter of a non-GBR, the BS 100 identifies a QoS (QoS requirement) of content on the basis of the DSCP field in a header of each packet 1, 2, or 3.

At this time, it is assumed that packets 1 and 2 are identified as the same QoS content and packet 3 is identified as different QoS content.

In this case, the BS 100 identifies the dedicated radio section QoS parameter mapped to content (QoS) of packets 1 and 2 and identifies the dedicated radio section QoS parameter mapped to content (QoS) of packet 3 in the 1:M mapping table, so as to perform dedicated radio section QoS mapping.

At this time, it is assumed that dedicated radio section QoS parameter 4 is mapped to content of packets 1 and 2 included in one service flow 7 and dedicated radio section QoS parameter 5 is mapped to content of packet 3 included in service flow 7 in the 1:N mapping table.

In this case, the BS 100 applies dedicated radio section QoS parameter 4 to packets #1 and #2 of service flow 7 transmitted to the terminal 10 and transmits SN #1 and SN #2 (packets #1 and #2 of service flow 7).

Further, the BS 100 applies dedicated radio section QoS parameter 5 to packet #3 of service flow 7 transmitted to the terminal 10 and transmits SN #1 (packet #3 of service flow 7).

The BS 100 may transmit the packets of one service flow 7 at the 1:N dedicated radio section QoS level obtained by converting the QoS level which the core network 20 applies into the dedicated radio section QoS level by transmitting SN #1 and SN #2 (packets #1 and #2 of service flow 7) to which dedicated radio section QoS parameter 4 is applied and SN #1 (packet #3 of service flow 7) to which dedicated radio section QoS parameter 5 is applied.

As described above, according to the radio section QoS control method of the present disclosure, it is possible to independently realize the DRB based QoS control in the radio section by separately implementing the QoS control of the radio section between the terminal and the access end (BS) regardless of the QoS control method between the access end and the core network among all sections from the terminal to the core network.

When the DRB based QoS control is realized in the radio section and the terminal performs handover between BSs, packets forwarded between a source BS and a target BS may not be normally transmitted during a handover process if mapping rules (mapping tables) between the source BS and the target BS are different.

For example, referring to FIG. 5, it may be assumed that QoS parameters A and B are mapped to dedicated radio section QoS parameter 1 in a mapping table pre-stored in and used by the BS 100.

It is assumed that packets (for example, #1, #2, and #3) of service flow 1 according to communication service 1 to which QoS parameter A is applied and packets (for example, #1, #2, and #3) of service flow 2 according to communication service 2 to which QoS parameter B is applied are received by the BS 100.

In this case, after identifying QoS parameters A and B applied to the service flow of each packet, the BS 100 may identify dedicated radio section QoS parameter 1 mapped to each of QoS parameters A and B in a mapping table which the BS 100 uses.

Accordingly, the BS 100 may apply dedicated radio section QoS parameter 1 to each of packets #1, #2, and #3 of service flow 1 and packets #1, #2, and #3 of service flow 2 and transmit the packets assigned sequence numbers SNs #1, #2, #3, #4, #5, and #6 in an order of reception to the terminal 10.

At this time, traffic flow in which the packet is transmitted in the radio section, to which dedicated radio section QoS parameter 1 is applied, may be DRB 1.

Hereinafter, for convenience of description, it is assumed that packets #1, #2, and #3 of service flow 1 are SNs #1, #3, and #5 of DRB 1 and packets #1, #2, and #3 of service flow 2 are SNs #2, #4, and $6 of DRB 1.

Meanwhile, the terminal 10 may perform handover from the BS 100 through which communication services 1 and 2 are used to another BS.

Hereinafter, for convenience of description, a source BS 100 which the terminal 10 accessed is referred to as a BS 100A and a target BS to which the terminal 10 performs handover is referred to as a BS 100B.

When the terminal 10 performs handover to the target BS 100B while accessed the BS 100A and used communication services 1 and 2, there is no big problem if mapping rules (mapping tables) which the BS 100A and the BS 100B use (store) for the DRB based QoS control in the radio section are the same as each other.

However, mapping rules (mapping tables) used (stored) by the source BS 100A and the target BS 100B may be different from each other.

For example, it is assumed that QoS parameter A is mapped to dedicated radio section QoS parameter 1 and QoS parameter B is mapped to dedicated radio section QoS parameter 2 in the mapping table used by (stored in) the BS 100B, which is unlike the BS 100A.

Further, a situation such as the above-described example is assumed, that is, it is assumed that packets (for example, #1, #2, and #3) of service flow 1 according to communication service 1 to which QoS parameter A is applied and packets (for example, #1, #2, and #3) of service flow 2 according to communication service 2 to which QoS parameter B is applied are received by the BS 100A.

In this case, when the terminal 10 performs handover to the target BS 100B while accessed the source BS 100A and used communication services 1 and 2, the BS 100A may forward packets #1, #2, and #3 of service flow 1 and packets #1, #2, and #3 of service flow 2 to be transmitted to the terminal 10 to the BS 100B during the handover process.

In the mapping table used by (stored in) the BS 100B, the BS 100B may identify dedicated radio section QoS parameters 1 and 2 mapped to QoS parameters A and B applied to service flows of respective packets.

Accordingly, the BS 100B may apply dedicated radio section QoS parameter 1 to packets #1, #2, and #3 of service flow 1 forwarded from the BS 100A and transmit SNs #1, #2, and #3 assigned sequence numbers according to the reception order of the packets to the terminal 10 (DRB 1).

Further, the BS 100B may apply dedicated radio section QoS parameter 2 to packets #1, #2, and #3 of service flow 2 forwarded from the BS 100A and transmit SNs #1, #2, and #3 assigned sequence numbers according to the reception order of the packets to the terminal 10 (DRB 2).

That is, when mapping rules (mapping tables) used by (stored in) the BS 100A and the BS 100B are different, the BS 100A transmits packets #1, #2, and #3 of service flow 1 and packets #1, #2, and #3 of service flow 2 to the terminal 10 through SNs #1, #2, #3, #4, #5, and #6 of DRB 1. But the BS 100B transmits packets #1, #2, and #3 of service flow 1 forwarded from the BS 100A to the terminal 10 through SNs #1, #2, and #3 of DRB 1 and SNs #1, #2, and #3 of service flow 2 to the terminal 10 through SNs #1, #2, and #3 of DRB 2.

In this case, if the terminal 10 setting QoS control information provided from the source BS 100A receives packets #1, #2, and #3 of service flow 2 from the BS 100B, the packets are received through SNs #1, #2, and #3 of DRB 2. If the terminal 10 receives the packets from the BS 100A, the packets are received through SNs #2, #4, and #6 of DRB 1. As a result, mismatching of sequence numbers may occur.

Accordingly, when mapping rules (mapping tables) used by (stored in) the BS 100A and the BS 100B are different from each other, packets forwarded during the handover process may not be normally transmitted to the terminal 10 due to mismatching of the sequence numbers.

Therefore, the present disclosure proposes a solution to normally transmit forwarded packets to the terminal during the handover process when the terminal performs the handover.

Specifically, as illustrated in FIG. 3, the BS apparatus 100 according to the present disclosure further includes a handover controller 150.

According to an embodiment of the present disclosure related to the handover, the handover controller 150 transfers a mapping table (mapping rule) of the storage unit 120 to a target BS when the terminal performs handover to the target BS.

Then, the target BS may transmit packets of the terminal forwarded from the BS apparatus 100 during the handover process at the converted dedicated radio section QoS level which is the same as that of the BS apparatus 100 on the basis of the mapping table (mapping rule) received from the BS apparatus 100.

Further, the handover controller 150 may receive a mapping table (mapping rule) used by the source BS for the terminal performing the handover from the source BS.

Then, the handover controller 150 interworks with the identification unit 110 and the transmission unit 130 to transmit packets of the terminal forwarded from the source BS during the handover process at the converted dedicated radio section QoS level which is the same as that of the source BS on the basis of the mapping table (mapping rule) received from the source BS.

Specifically, the BS apparatus 100 according to the present disclosure may be a source BS or a target BS in a viewpoint of the handover of the terminal 10.

When the BS apparatus 100 according to the present disclosure is the source BS (for example, 100A), the handover controller 150 transmit the mapping table (mapping rule) of the storage unit 120 to the target BS 100B in the case in which the terminal 10 performs handover to the target BS 100B.

For example, when the handover controller 150 determines the handover of the terminal 10 on the basis of measurement information reported from the terminal 10, the handover controller 150 transmits a handover request to the target BS 100B.

At this time, when transmitting the handover request, the handover controller 150 may transfer the mapping table (mapping rule) of the storage unit 120 to the target BS 100B.

Of course, the handover controller 150 may perform all sorts of operations for the handover of the terminal 10 to the target BS 100B as well as transmission of the handover request and may forward packets of the terminal 10 received from the core network 20 during the handover process to the target BS 100B.

Then, the target BS 100B can transmit the packets of the terminal 10 forwarded from the BS apparatus 100, that is, the source BS (for example, 100A) during the handover process at the converted dedicated radio section QoS level which is the same as that of the source BS (for example, 100A) on the basis of the mapping table (mapping rule) received from the source BS (for example, 100A).

When the BS apparatus 100 according to the present disclosure is the target BS (for example, 100B), the handover controller 150 receives the mapping table (mapping rule) used by the source BS 100A for the terminal 10 performing the handover from the source BS 100A.

For example, when receiving the handover request from the source BS 100A, the handover controller 150 may also receive the mapping table (mapping rule) of the source BS 100A.

Of course, when receiving the handover request, the handover controller 150 may perform all sorts of operations for the handover of the terminal 10 from the source BS 100A to the target BS 100B and may transmit packets forwarded from the source BS 100B during the handover process to the terminal 10.

At this time, the handover controller 150 interworks with the identification unit 110 and the transmission unit 130 to transmit the packets of the terminal 10 forwarded from the source BS 100A during the handover process at the converted dedicated radio section QoS level on the basis of the mapping table (mapping rule) received from the source BS 100A.

That is, according to interworking with the handover controller 150, the identification unit 110 maps the packets of the terminal 10 forwarded from the source BS 100A to the dedicated radio section QoS parameters on the basis of the mapping table (mapping rule) received from the source BS 100A instead of the mapping table (mapping rule) stored in the storage unit 120.

Accordingly, the identification unit 110 may convert the QoS level of the packets of the terminal 10 forwarded from the source BS 100A into the dedicated radio section QoS level which is the same as that of the source BS 100A according to interworking with the handover controller 150.

The transmission unit 130 may apply the dedicated radio section QoS parameters identified by the identification unit 110 to the packets to transmit the forwarded packets of the terminal 10 according to interworking with the handover controller 150.

Accordingly, the transmission unit 130 may transmit the forwarded packets of the terminal 10 at the dedicated radio section QoS level which is the same as that of the source BS 100A according to interworking with the handover controller 150.

In such a situation, even though mapping rules (mapping tables) used by (stored in) the BS 100A and the BS 100B are different from each other, the target BS 100B may equally use the mapping rule (mapping table) of the source BS 100A for data (packets) forwarded during the handover process.

Accordingly, if the source BS 100A transmits packets #1, #2, and #3 of service flow 1 and packets #1, #2, and #3 of service flow 2 to the terminal 10 through SNs #1, #2, #3, #4, #5, and #6 of DRB 1, the target BS 100B may also transmit packets #1, #2, and #3 of service flow 1 and packets #1, #2, and #3 of service flow 2 forwarded from the source BS 100A to the terminal 10 through SNs #1, #2, #3, #4, #5, and #6 of DRB 1.

Since mismatching of sequence numbers does not occur even after radio section access is changed from the source BS 100A to the target BS 100B during the handover process, the terminal 10 setting QoS control information provided from the source BS 100A may normally receive all of the packets forwarded to the target BS 100B from the source BS 100A.

Furthermore, when the terminal 10 performs the handover, the handover controller 150 identifies whether transmission of uplink packets according to used communication services 1 and 2 has been completed and whether the handover has been completed.

For example, when receiving a message indicating completion of transmission of uplink packets according to communication services 1 and 2 from the terminal 10, the handover controller 150 may transmit a response message and identify completion of the uplink packets by the terminal 10.

Further, when identifying an end marker packet among the packets forwarded from the source BS 100A, the handover controller 150 may identify completion of this handover.

Alternatively, when all procedures of the handover process have finished, the handover controller 150 may identify completion of this handover.

Accordingly, when identifying completion of transmission of uplink packets by the terminal 10 and completion of this handover, the handover controller 150 interworks with the identification unit 110 and the transmission unit 130 to transmit packets of the terminal received from the core network 20 after a time point of the identification at the converted dedicated radio section QoS level on the basis of the mapping table (mapping rule) pre-stored in the storage unit 120 instead of the mapping table received from the source BS 100A.

That is, after the time point of the identification for the terminal 10, the identification unit 110 maps the dedicated radio section QoS parameters to the packets of the terminal 10 on the basis of the mapping table (mapping rule) stored in the storage unit 120.

Then, after the time point of the identification for the terminal 10, the identification unit 110 may convert the QoS level of the packets of the terminal 10 into the dedicated radio section QoS level according to the mapping table (mapping rule) stored in the storage unit 120.

When transmitting packets of the terminal 10, the transmission unit 130 may apply the dedicated radio section QoS parameter identified by the identification unit 110 and transmit the packets of the terminal 10 at the converted dedicated radio section QoS level.

When radio section access is changed from the source BS 100A to the target BS 100B during the handover process from the source BS 100A to the target BS 100B, the terminal 10 may receive QoS control information.

More specifically, the terminal 10 may receive QoS control information from the target BS 100B in an RRC setup process during the handover process.

Accordingly, after transmitting a message indicating completion of transmission of uplink packets according to communication services 1 and 2, the terminal 10 may set the previously received QoS control information from the target BS 100B.

Hereinafter, in such a situation, it is assumed that packets (for example, #6, #7, and #8) of service flow 1 according to communication service 1 to which QoS parameter A is applied and packets (for example, #6, #7, and #8) of service flow 2 according to communication service 2 to which QoS parameter B is applied are received from the core network 20 after the time point of the identification for the terminal 10.

In this case, the BS apparatus 100 (target BS 100B) may apply dedicated radio section QoS parameter 1 to packets #6, #7, and #8 of service flow 1 on the basis of the mapping table used by (stored in) the BS apparatus 100 and transmit SNs #1, #2, and #3 assigned sequence numbers according to the reception order of the packets to the terminal 10 (DRB 1).

Further, in this case, the BS apparatus 100 (target BS 100B) may apply dedicated radio section QoS parameter 2 to packets #6, #7, and #8 of service flow 2 on the basis of the mapping table used by (stored in) the BS apparatus 100 and transmit SNs #1, #2, and #3 assigned sequence numbers according to the reception order of the packets to the terminal 10 (DRB 2).

At this time, since the terminal 10 sets QoS control information provided from the BS apparatus 100 (target BS 100B), the terminal has no problem of normally receiving packets and also no problem of transmitting uplink packets.

Hereinafter, other embodiments of the present disclosure related to the handover will be described.

When the terminal performs handover to the target BS, the handover controller 150 transfers packet number information for each service flow to the target BS.

Then, the target BS may maintain the order of packet numbers for each service flow on the basis of the packet number information even though packets of the terminal forwarded from the BS apparatus 100 (source BS 100A) during the handover process are transmitted at the converted dedicated radio section QoS level which is different from that of the BS apparatus 100.

Specifically, based on assumption that the BS apparatus 100 is the source BS (for example, 100A), when the terminal 10 performs handover to the target BS 100B, the handover controller 150 performs all sorts of operations such as signaling transmission and reception for the handover of the terminal 10 to the target BS 100B as well as transmission of the handover request to the target BS 100B.

The handover controller 150 transfers, to the target BS 100B, sequence number information (for example, SN status transfer) of sequence numbers (SN #N, N=1, 2, 3, . . . ) on the basis of DRBs (dedicated radio section QoS levels) assigned to packets transmitted between the BS apparatus 100 and the terminal 10 in all sorts of operations.

At this time, according to the present disclosure, the handover controller 150 further transfers to the target BS 100B, packet number information of packet numbers (#N, N=1, 2, 3, . . . ) for each service flow additionally assigned to packets transmitted between the core network 20 and the BS 100 as well as the sequence number information on the basis of DRBs.

The sequence number information on the basis of DRBs may be Packet Data Convergence Protocol (PDCP) layer level information.

The packet number information for each service flow may be Service Data Application Protocol (SDAP) layer level information.

Accordingly, the target BS 100B transmits the packets of the terminal 10 forwarded during the handover process at the converted dedicated radio section QoS level on the basis of the mapping table (mapping rule) stored in the target BS 100B, so that the packets of the terminal 10 forwarded/transmitted through the target BS 10B may be transmitted through the same DRB as that of the source BS (for example, 100A) or a different DRB from that of the source BS, but the packet number sequences for each service flow may be maintained.

Therefore, even though mismatching occurs between DRB-based sequence number (SN #N) of packets received from the source BS 100A and DRB-based sequence numbers (SN #N) of packets received from the target BS 100B during the handover process, the terminal 10 may normally receive all the forwarded packets on the basis of the packet numbers (#N) for each service flow of the packets.

Meanwhile, when the BS apparatus 100 according to the present disclosure is the target BS (for example, 100B), the handover controller 150 may additionally receive packet number information for each service flow as well as sequence number information on the basis of DRBs when receiving the handover request from the source BS 100A.

Since the BS apparatus 100 transmits the packets of the terminal 10 forwarded during the handover process at the converted dedicated radio section QoS level on the basis of the mapping table (mapping rule) stored in the BS apparatus 100, the packets of the terminal 10 forwarded/transmitted through the target BS 100B may be transmitted through the same DRB as that of the source BS 100A or a different DRB from that of the source BS, but packet number sequences for each service flow may be maintained.

Hereinafter, control flow in the terminal handover according to the radio section QoS control method according to an embodiment of the present disclosure will be described with reference to FIG. 10.

Figure 10:
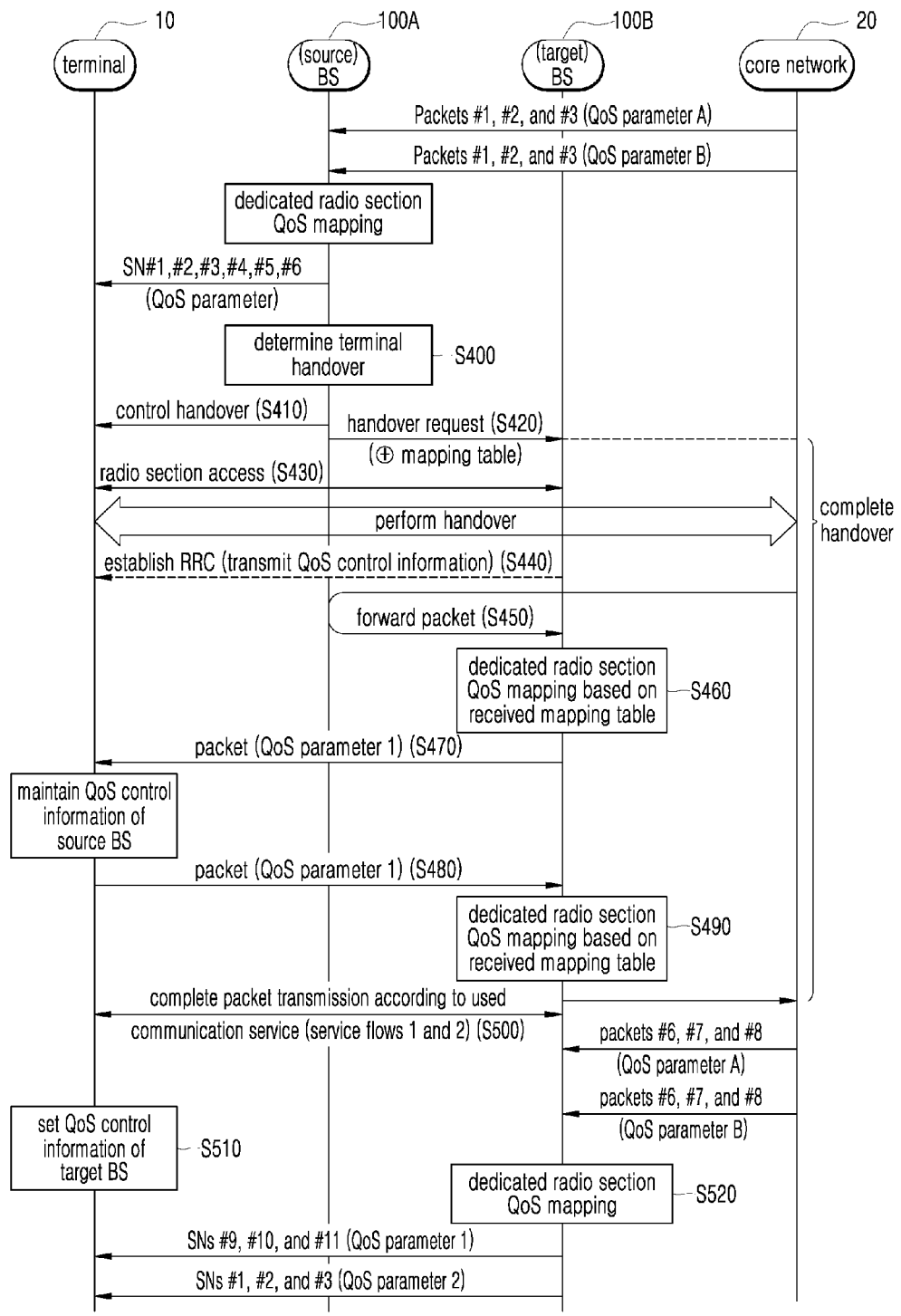
FIG. 10 is a control flowchart illustrating the operation of terminal handover based on a radio section QoS control method according to an embodiment of the present disclosure.

Prior to description of FIG. 10, it is assumed that QoS parameters A and B are mapped to dedicated radio section QoS parameter 1 (DRB 1) in a mapping table of the BS 100A and QoS parameter A is mapped to dedicated radio section QoS parameter) (DRB 1) and QoS parameter B is mapped to dedicated radio section QoS parameter 2 (DRB 2) in a mapping table of the BS 100B.

It is assumed that the terminal 10 uses communication services 1 and 2 and thus receives packets (for example, #1, #2, and #3) of service flow 1 according to communication service 1 and packets (for example, #1, #2, and #3) of service flow 2 according to communication service 2 to which QoS parameter B is applied.

After identifying QoS parameters A and B applied to the service flow of each packet in a mapping table of the BS 100A, the BS 100A may identify dedicated radio section QoS parameter 1 mapped to each of QoS parameters A and B.

Accordingly, the BS 100A may apply dedicated radio section QoS parameter 1 to each of packets #1, #2, and #3 of service flow 1 and packets #1, #2, and #3 of service flow 2 and transmit SNs #1,#2,#3,#4,#5, and #6 assigned sequence numbers according to the reception order of the packets to the terminal 10 (DRB 1).

At this time, when the BS 100A determines the handover of the terminal 10 on the basis of measurement information reported from the terminal 10 in S400, the BS 100A transmits information (handover control) required for the handover of the terminal 10 to the target BS 100B to the terminal 10 in S410 and also transmits a handover request to the target BS 100B in S420.

When transmitting the handover request, the BS 100A may transfer the mapping table (mapping rule) of the storage unit 120 to the target BS 100B.

Further, between the terminal 10, the source BS 100A, the target BS 100B, and the core network 20, all sorts of handover operations such as signaling transmission and reception for the handover of the terminal 10 from the source BS 100A to the target BS 100B are performed in S430.

During the handover process, the BS 100B may transmit QoS control information of the BS 100B to the terminal 10 in an RRC setup process in S440.

Meanwhile, the terminal 10 disconnects radio section access to the BS 100A and switches the radio section access to the target BS 100B in the beginning of the handover process.

The BS 100A forward packets of the terminal 10 received from the core network 20 to the target BS 100B during the handover process in S450.

The BS 100B may apply the mapping table (mapping rule) received from the source BS 100A in S420 to the packets of the terminal 10 forwarded from the source BS 100A during the handover process in S460.

That is, for the forwarded packets of service flows 1 and 2 of the terminal 10, the BS 100B may map QoS parameters A and B applied by the core network 20 to dedicated radio section QoS parameter 1 on the basis of the mapping table (mapping rule) received from the source BS 100A and thus transmit the forwarded packets of the terminal 10 at the converted dedicated radio section QoS level (DRB 1) which is the same as that of the source BS 100A in S470.

Since mismatching of sequence numbers does not occur even after radio section access is changed from the source BS 100A to the target BS 100B during the handover process, the terminal 10 setting (maintaining) QoS control information provided from the source BS 100A may normally receive all of the packets forwarded from the target BS 100B from the source BS 100A.

Of course, when uplink packets of service flows 1 and 2 are generated, the terminal 10 may apply the same dedicated radio section QoS parameter (for example, QoS parameter 1) which the BS 100B applies in the downlink to the uplink packets on the basis of the set (maintained) QoS control information from the source BS 100A and transmit the uplink packets at the same dedicated radio section QoS level (DRB 1) as that of the downlink in S480.

Accordingly, upon receiving the uplink packets from the terminal 10, the BS 100B maps and applies the dedicated radio section QoS parameter (for example. QoS parameter 1) to the QoS parameter (for example, QoS parameter A or B)

applied by the core network 20 by inversely performing QoS mapping of step S460 in S490 and transmits the uplink packets to the core network 20.

Upon receiving a message indicating completion of transmission of uplink packets according to communication services 1 and 2 from the terminal 10, the BS 100B may transmit a response message and identify completion of transmission of the uplink packets by the terminal 10.

Further, the BS 100B may identify whether this handover has been completed in various ways.

When identifying all of the completion of transmission of uplink packets by the terminal 10 and the completion of this handover (S500), after a time point of the identification, the BS 100B transmits packets of the terminal 10 received from the core network 20 at the converted dedicated radio section QoS level on the basis of the mapping table (mapping rule) pre-stored in the storage unit 120 instead of the mapping table received from the source BS 100A.

For example, it is assumed that the terminal 10 uses communication services 1 and 2 and thus receives packets (for example, #6, #7, and #8) of service flow 1 according to communication service 1 and packets (for example, #6, #7, and #8) of service flow 2 according to communication service 2 to which QoS parameter B is applied.

The BS 100B applies the mapping table (mapping rule) of the BS 100B to packets #6, #7, and #8 of service flow 1 and packets #6, #7, and #8 of service flow 2 instead of the mapping table received from the source BS 100A in S510, S520.

Accordingly, the BS 100B may apply dedicated radio section QoS parameter 1 to packets #6, #7, and #8 of service flow 1 and transmit SNs #1,#2, and #3 assigned sequence numbers according to the reception order of the packets to the terminal 10 (DRB 1), and may apply dedicated radio section QoS parameter 2 to packets #6, #7, and #8 of service flow 2 and transmit SNs #1, #2, and #3 assigned sequence numbers according to the reception order of the packets to the terminal 10 (DRB 2).

The radio section QoS control method according to the present disclosure as described above may be implemented in the form of a program command which can be executed through various computer means and recorded in a computer-readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

An aspect of the present disclosure is to implement the differential QoS control in a radio section more precisely without any increase in complexity and load compared to the conventional bearer based QoS control method.

In accordance with an aspect of the present disclosure, a Base Station (BS) apparatus is provided. The BS apparatus comprises a non-transitory computer-readable memory to store instructions that, when executed by one or more processors of the BS apparatus, cause the BS apparatus to: receive, from a core network, a mapping rule in which at least one dedicated radio section Quality of Service (QoS) parameter is mapped to at least one QoS parameter applied to a service flow by the core network; store the mapping rule; identify, based on the mapping rule, a particular dedicated radio section QoS parameter of the at least one dedicated radio section QoS parameter mapped to a particular QoS parameter of the at least one QoS parameter, the particular QoS parameter being applied to a particular service flow for a packet to be transmitted to a terminal; and transmit the packet at a dedicated radio section QoS level by applying the identified particular dedicated radio section QoS parameter in packet transmission to the terminal.

In accordance with another aspect of the present disclosure, a method of controlling a QoS in a radio section is provided. The method includes: receiving, by a base station (BS) apparatus and from a core network, a mapping rule in which at least one dedicated radio section QoS parameter is mapped to at least one QoS parameter applied to a service flow by the core network; storing, by the BS apparatus, the mapping rule; identifying, by the BS apparatus based on the mapping rule, a particular dedicated radio section QoS parameter of the at least one dedicated radio section QoS parameter mapped to a particular QoS parameter of the at least one QoS parameter, the particular QoS parameter being applied to a particular service flow for a packet to be transmitted to a terminal; and transmitting, by the BS apparatus, the packet at the particular dedicated radio section QoS level by applying the identified particular dedicated radio section QoS parameter in the packet transmission.

According to embodiments of the present disclosure, it is possible to implement the different QoS control in the radio section more precisely without any increase in complexity and load compared to the conventional bearer based QoS control method.

Therefore, various embodiments of the present disclosure derive an effect of applying more differential QoS, that is, a variety of service quality to each communication service by implementing the differential QoS control in the radio section more precisely.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A Base Station (BS) apparatus comprising:
a non-transitory computer-readable memory to store instructions that, when executed by one or more processors of the BS apparatus, cause the BS apparatus to:
receive, from a core network, a mapping rule in which at least one dedicated radio section Quality of Service (QoS) parameter is mapped to at least one QoS parameter applied to service flows by the core network;
store the mapping rule and perform, based on the stored mapping rule, a radio resource control (RRC) setup with a terminal;
identify, based on the mapping rule, a particular dedicated radio section QoS parameter of the at least one dedicated radio section QoS parameter mapped to a particular QoS parameter of the at least one QoS parameter, the particular QoS parameter being applied to a particular service flow for a packet to be transmitted to the terminal; and
transmit, based on the RRC setup, the packet at a dedicated radio section QoS level such that the identified particular dedicated radio section QoS parameter is applied in packet transmission to the terminal.

2. The BS apparatus of claim 1, wherein a number of the at least one dedicated radio section QoS parameter is greater than a number of the at least one QoS parameter in the mapping rule.

3. The BS apparatus of claim 1, wherein two or more different QoS parameters are mapped to one dedicated radio section QoS parameter in the mapping rule.

4. The BS apparatus of claim 3, wherein the two or more different QoS parameters include QoS parameters which the core network applies to at least one of
a communication service for periodically transmitting a small quantity of data equal to or less than a particular size, or
an Internet of Things (IoT) service.

5. The BS apparatus of claim 1, wherein the instructions, when executed by the one or more processors of the BS apparatus, further cause the BS apparatus to:
identify a QoS of content by identifying a differentiated services code point (DSCP) field for indicating a service quality type (DiffServ) in a header of the packet when a QoS parameter applied to the service flow is the single QoS parameter, and
identify a dedicated radio section QoS parameter mapped to the identified QoS of the content in the mapping rule.

6. The BS apparatus of claim 1, wherein the instructions, when executed by the one or more processors of the BS apparatus to perform the RRC setup with the terminal, further cause the BS apparatus to cause a radio resource control (RRC) message including QoS control information for identifying the particular dedicated radio section QoS parameter to be transferred the terminal.

7. The BS apparatus of claim 1, wherein the instructions, when executed by the one or more processors of the BS apparatus, further cause the BS apparatus to cause the mapping rule to be transmitted to a target BS during a handover of the terminal to the target BS, so that a packet of the terminal forwarded from the BS apparatus to the target BS during the handover is transmitted at a converted dedicated radio section QoS level based on the transmitted mapping rule from the BS apparatus.

8. The BS apparatus of claim 7, wherein, when the mapping rule used by the BS apparatus is transferred to the target BS during the handover of the terminal from the BS apparatus, the packet of the terminal forwarded from the BS apparatus during the handover to the target BS is transmitted at a converted dedicated radio section QoS level corresponding to the particular dedicated radio section QoS level based on the mapping rule transferred from the BS apparatus.

9. The BS apparatus of claim 8, wherein, when completion of transmission of the packet at the converted dedicated radio section QoS level and completion of the handover are identified, another packet is transmitted from the target BS using a mapping rule stored by the target BS prior to the handover instead of the mapping rule transferred from the BS apparatus.

10. The BS apparatus of claim 1, wherein the instructions, when executed by the one or more processors of the BS apparatus, further cause the BS apparatus to cause packet number information for a service flow to be transmitted to a target BS during a handover of the terminal to the target BS, so that a packet number sequence for the service flow is maintained based on the packet number information at the target BS when a packet of the terminal forwarded from the BS apparatus during the handover is transmitted at a converted dedicated radio section QoS level which is different from that of the BS apparatus.

11. A method of controlling a quality of service (QoS) in a radio section to a terminal, the method comprising:
receiving, by a base station (BS) apparatus and from a core network, a mapping rule in which at least one dedicated radio section QoS parameter is mapped to at least one QoS parameter applied to a service flow by the core network;
storing, by the BS apparatus, the mapping rule;
generating, by the BS apparatus, a radio resource control (RRC) message based on the stored mapping rule, and transmitting the RRC message to the terminal to perform RRC setup with the terminal;
identifying, by the BS apparatus based on the mapping rule, a particular dedicated radio section QoS parameter of the at least one dedicated radio section QoS parameter mapped to a particular QoS parameter of the at least one QoS parameter, the particular QoS parameter being applied to a particular service flow for a packet to be transmitted to the terminal; and
transmitting, by the BS apparatus and based on the RRC setup, the packet at the particular dedicated radio section QoS level such that the identified particular dedicated radio section QoS parameter is applied when transmitting the packet to the terminal.

12. The method of claim 11, wherein a number of the at least one dedicated radio section QoS parameter is greater than a number of the at least one QoS parameter in the mapping rule.

13. The method of claim 11, wherein two or more different QoS parameters are mapped to one dedicated radio section QoS parameter in the mapping rule.

14. The method of claim 13, wherein the two or more different QoS parameters include QoS parameters which the core network applies to at least one of a communication service for periodically transmitting a small quantity of data equal to or less than a particular size, or an Internet of Things (IoT) service.

15. The method of claim 11, further comprising:

identifying, by the BS apparatus, a QoS of content by identifying a differentiated services code point (DSCP) field for indicating a service quality type (DiffServ) in a header of the packet when a QoS parameter applied to the service flow is the single QoS parameter, and identifying, by the BS apparatus, a dedicated radio section QoS parameter mapped to the identified QoS of the content in the mapping rule.

16. The method of claim 11, wherein the RRC message including QoS control information for identifying the particular dedicated radio section QoS parameter to the terminal.

17. The method of claim 11, further comprising:

transmitting, by the BS apparatus, the mapping rule to a target BS during a handover of the terminal to the target BS, so that a packet of the terminal forwarded from the BS apparatus to the target BS during the handover is transmitted at a converted dedicated radio section QoS level based on the transmitted mapping rule from the BS apparatus.

18. The method of claim 17, wherein, when the mapping rule used by the BS apparatus is transferred to the target BS during the handover of the terminal from the BS apparatus, the packet of the terminal forwarded from the BS apparatus during the handover to the target BS is transmitted at a converted dedicated radio section QoS level corresponding to the particular dedicated radio section QoS level based on the mapping rule transferred from the BS apparatus.

19. The method of claim 18, wherein, when completion of transmission of the packet at the converted dedicated radio section QoS level and completion of the handover are identified, another packet is transmitted from the target BS using a mapping rule stored by the target BS prior to the handover instead of the mapping rule transferred from the BS apparatus.

20. The method of claim 11, further comprising:

transmitting, by the BS apparatus, packet number information for a service flow to a target BS during a handover of the terminal to the target BS, so that a packet number sequence for the service flow is maintained based on the packet number information at the target BS when a packet of the terminal forwarded from the BS apparatus during the handover is transmitted at a converted dedicated radio section QoS level which is different from that of the BS apparatus.

* * * * *